United States Patent
Di Pietro et al.

(10) Patent No.: US 11,797,883 B2
(45) Date of Patent: Oct. 24, 2023

(54) USING RAW NETWORK TELEMETRY TRACES TO GENERATE PREDICTIVE INSIGHTS USING MACHINE LEARNING

(71) Applicant: Cisco Technology, Inc., San Jose, CA (US)

(72) Inventors: Andrea Di Pietro, Lausanne (CH); Javier Cruz Mota, Lussy-sur-Morges (CH); Sukrit Dasgupta, Norfolk, MA (US); Jean-Philippe Vasseur, Saint Martin D'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 599 days.

(21) Appl. No.: 16/809,060

(22) Filed: Mar. 4, 2020

(65) Prior Publication Data

US 2021/0279632 A1    Sep. 9, 2021

(51) Int. Cl.
| | |
|---|---|
| *G06F 15/16* | (2006.01) |
| *G06N 20/00* | (2019.01) |
| *H04L 41/22* | (2022.01) |
| *H04L 41/14* | (2022.01) |
| *G06N 5/04* | (2023.01) |
| *H04L 41/16* | (2022.01) |
| *G06F 15/173* | (2006.01) |

(52) U.S. Cl.
CPC .............. *G06N 20/00* (2019.01); *G06N 5/04* (2013.01); *H04L 41/14* (2013.01); *H04L 41/16* (2013.01); *H04L 41/22* (2013.01)

(58) Field of Classification Search
CPC .......... G06N 20/00; G06N 5/04; H04L 41/14; H04L 41/16; H04L 41/22; H04L 41/142; H04L 41/147; H04L 43/08

USPC ......................................................... 709/224
See application file for complete search history.

(56) References Cited

U.S. PATENT DOCUMENTS

| | | | |
|---|---|---|---|
| 10,192,172 B2 | 1/2019 | Chan et al. | |
| 11,048,677 B1* | 6/2021 | Chandrashekar | ....... H04L 43/04 |
| 11,099,928 B1* | 8/2021 | Vah | ..................... G06F 11/0793 |
| 11,366,842 B1* | 6/2022 | Swaminathan | ........ G06N 5/022 |
| 11,381,463 B2* | 7/2022 | Yang | ..................... H04L 41/142 |
| 2016/0267397 A1 | 9/2016 | Carlsson | |
| 2018/0032915 A1 | 2/2018 | Nagaraju et al. | |
| 2019/0280942 A1 | 9/2019 | Cote et al. | |
| 2021/0165704 A1* | 6/2021 | Savir | ..................... G06F 11/079 |
| 2021/0203576 A1* | 7/2021 | Padfield | .................. H04L 41/16 |

(Continued)

FOREIGN PATENT DOCUMENTS

WO    WO-2018-195667 A1    11/2018

*Primary Examiner* — Karen C Tang
(74) *Attorney, Agent, or Firm* — BEHMKE INNOVATION GROUP LLC; Kenneth J. Heywood; Jonathon P. Western

(57) ABSTRACT

In one embodiment, a service receives telemetry data collected from a plurality of different networks. The service combines the telemetry data into a synthetic input trace. The service inputs the synthetic input trace into a plurality of machine learning models to generate a plurality of predicted key performance indicators (KPIs), each of the models having been trained to assess telemetry data from an associated network in the plurality of different networks and predict a KPI for that network. The service compares the plurality of predicted KPIs to identify one of the plurality of different networks as exhibiting an abnormal behavior.

18 Claims, 7 Drawing Sheets

(56) References Cited

U.S. PATENT DOCUMENTS

2021/0224699 A1\* 7/2021 Soundrarajan ........ H04L 41/147
2021/0241130 A1\* 8/2021 Zaslavsky .............. G06N 20/00
2021/0250222 A1\* 8/2021 Boussac ................ H04L 41/064
2021/0258808 A1\* 8/2021 Mahimkar ............ H04W 24/08
2021/0360083 A1\* 11/2021 Duggal .................. H04L 67/34

\* cited by examiner

USING RAW NETWORK TELEMETRY TRACES TO GENERATE PREDICTIVE INSIGHTS USING MACHINE LEARNING

TECHNICAL FIELD

The present disclosure relates generally to computer networks, and, more particularly, to using raw network telemetry traces to generate predictive insights using machine learning.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available the bandwidth, packet loss, jitter, and the like, to ensure that the experiences of users of the network are not impinged.

Recent advances in the field of machine learning have allowed network assurance systems to extend their analysis and also make predictions about future network conditions and events in a network, such as upcoming issues and failures. In contrast to reactive approaches, this now allow a network assurance system to initiate corrective measures before they actually occur. For example, the network assurance service may cause traffic in the network to be rerouted away from a networking device that is predicted to fail.

In general, the prediction of a certain network condition or event using a machine learning model requires that it first be observed in the network. This allows the model to be trained to recognize the behavioral pattern leading up to that condition or event. However, by their very nature, failures and other issues are rare occurrences in many networks. This can lead to the network being 'fragile' to conditions and events that have not yet occurred.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
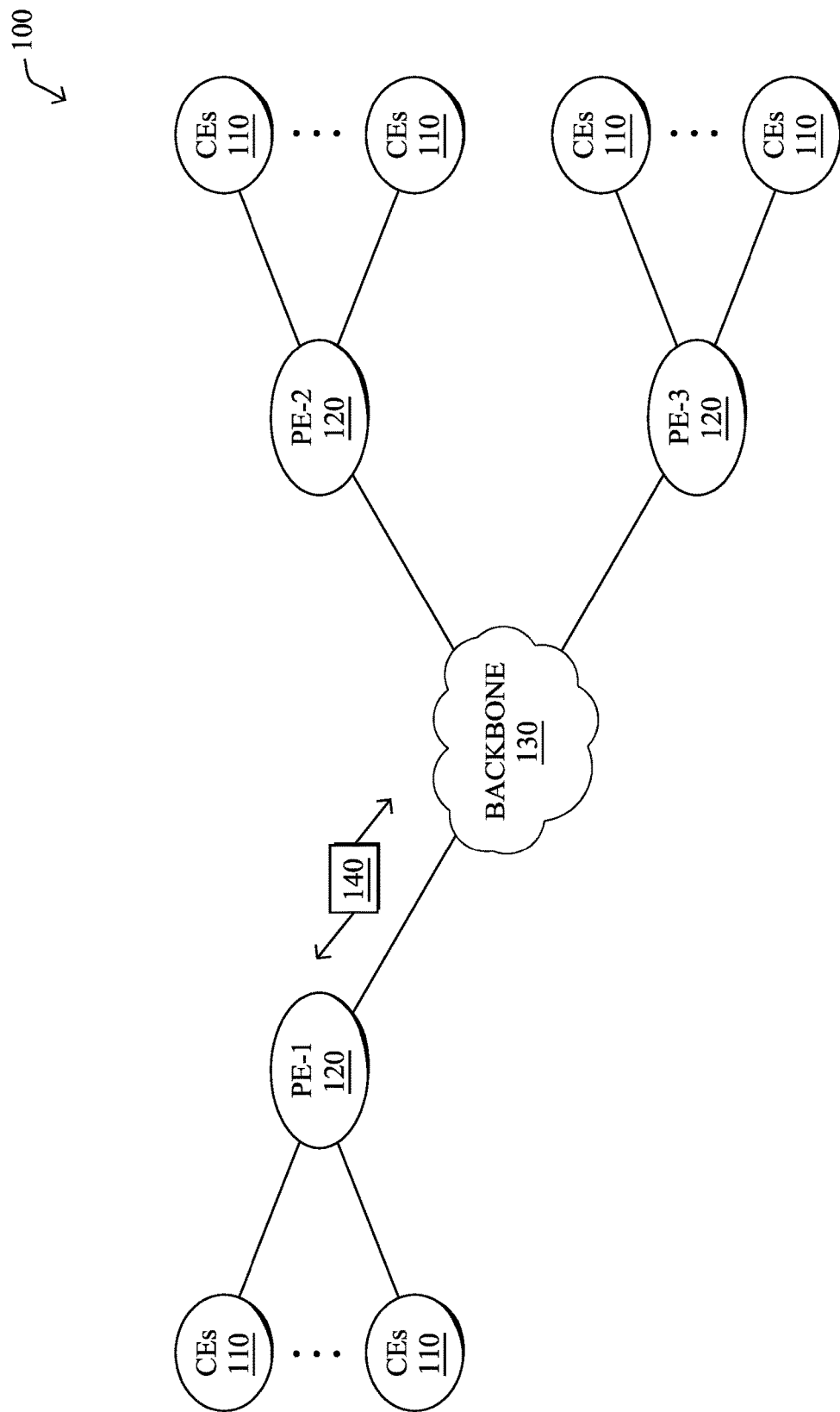
FIGS. 1A-1B illustrate an example computer network.

According to one or more embodiments of the disclosure, a service receives telemetry data collected from a plurality of different networks. The service combines the telemetry data into a synthetic input trace. The service inputs the synthetic input trace into a plurality of machine learning models to generate a plurality of predicted key performance indicators (KPIs), each of the models having been trained to assess telemetry data from an associated network in the plurality of different networks and predict a KPI for that network. The service compares the plurality of predicted KPIs to identify one of the plurality of different networks as exhibiting an abnormal behavior.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) via a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
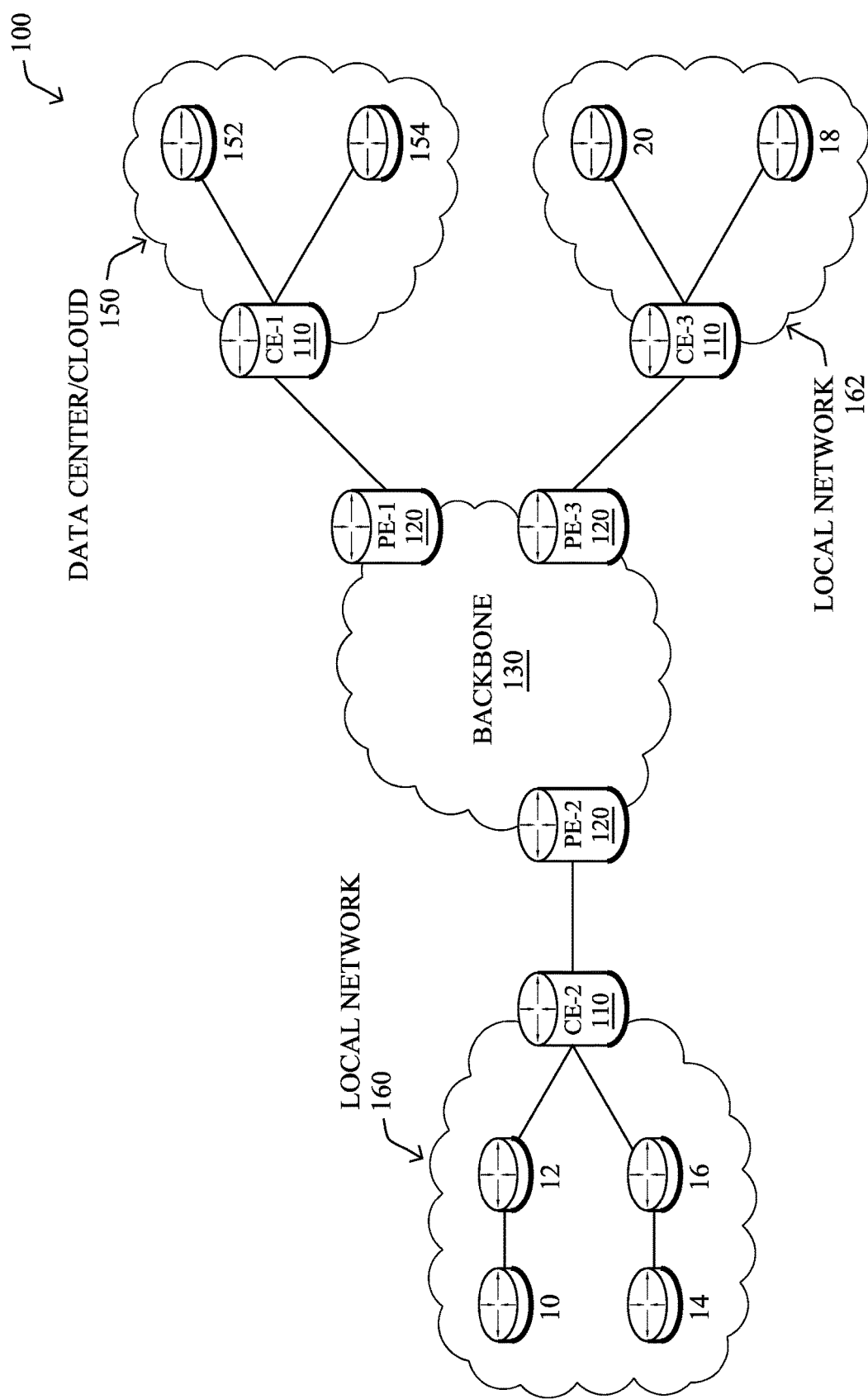

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
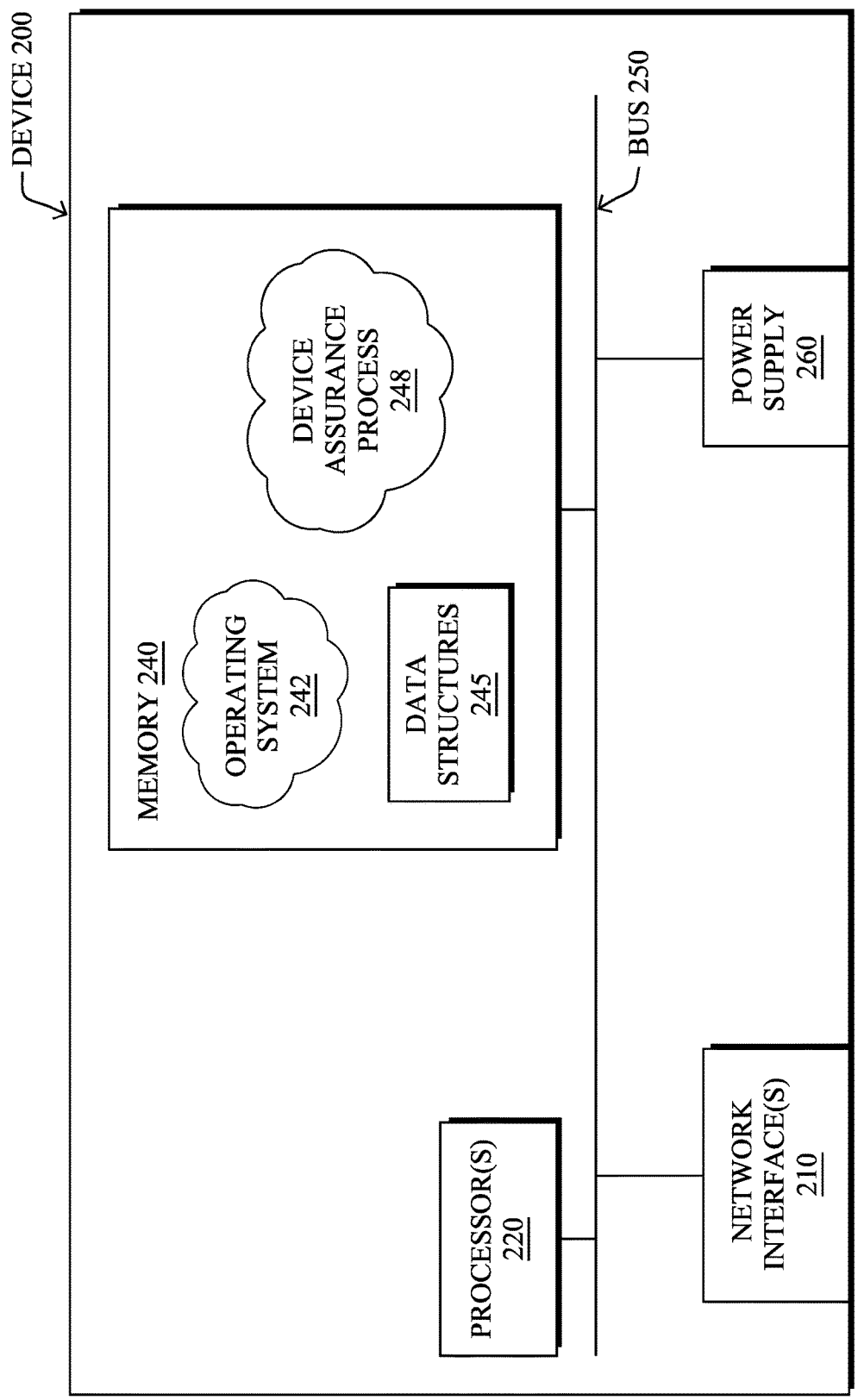
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may utilize machine learning techniques to enforce policies and/or monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) models, artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted poor performance in the network or the presence of an anomalous condition. Conversely, the false negatives of the model may refer to the number of times the model predicted good performance when, in fact, poor performance occurred. True negatives and positives may refer to the number of times the model correctly predicted whether the performance was good or poor, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
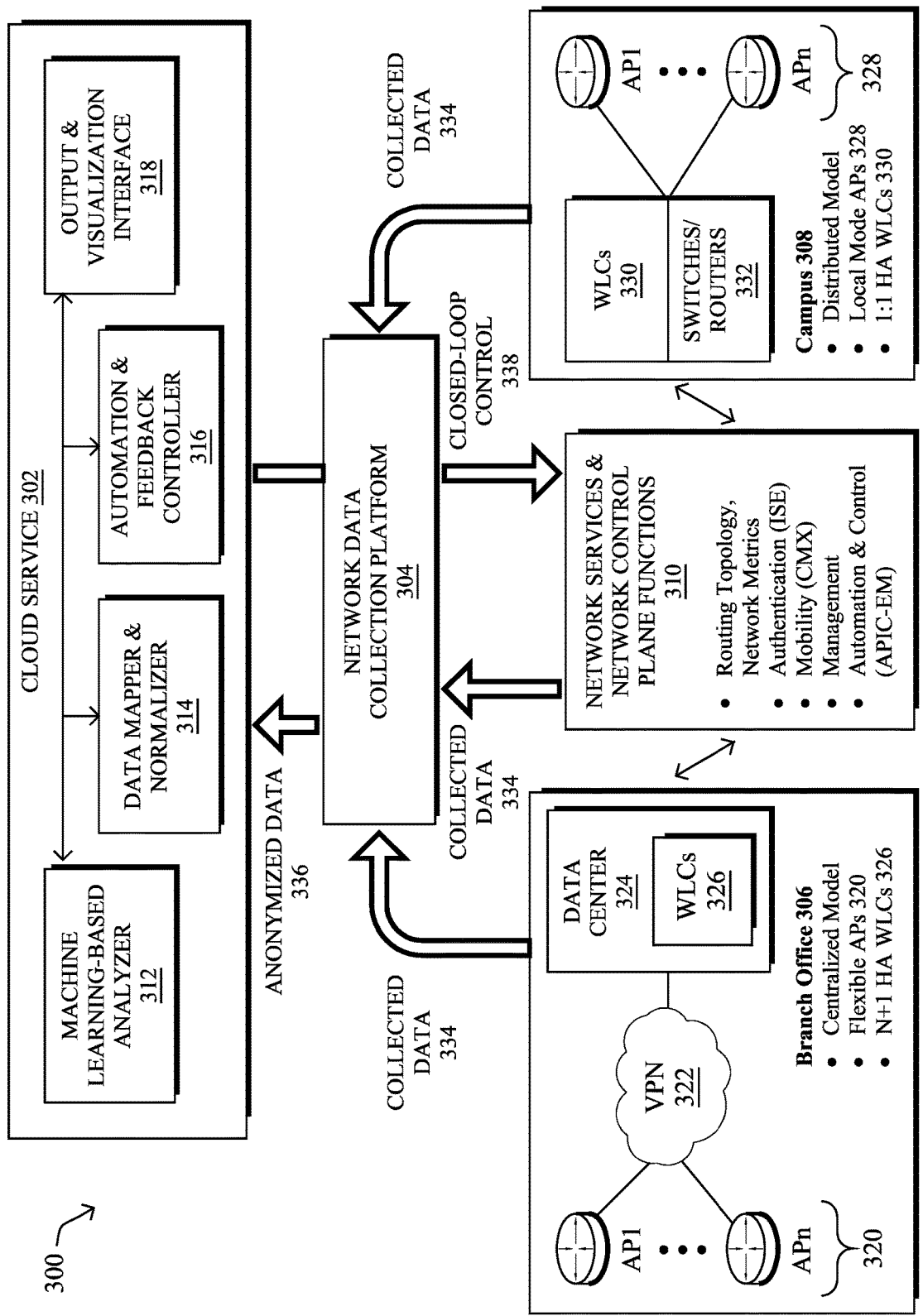
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APn) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a key feature of network assurance cloud service 302 is its ability to leverage machine learning to predict/forecast network behaviors such as predicted key performance indicators (KPIs) for the network. This allows service 302 to address potential network issues before they occur (e.g., by changing a network configuration, rerouting traffic, etc.). Typically, this is done by training a machine learning model using the telemetry data from the network leading up to the behavior of interest. For example, by training the model to recognize the behavioral pattern leading up to a failure or other issue, the model can then recognize this pattern going forward.

Unfortunately, some network behaviors (e.g., throughput issues, onboarding issues, etc.) may not have been witnessed in the past for a particular network. As a result, the network may be particularly 'fragile' to certain input conditions. In other words, since the specific patterns associated with that issue were never observed in the network, their first appearance can lead to the network assurance service failing to predict the resulting issue.

Using Raw Network Telemetry Traces to Generate Predictive Insights Using Machine Learning The techniques introduced herein provide a predictive approach to uncover potential issues/abnormal network behaviors, also referred to herein as 'predictive insights,' by applying the learned model for the network to a synthetic input trace generated as a combination of observed network behaviors across any number of different networks. In some aspects, the techniques herein collect raw telemetry data traces from different networks and generate synthetic traces as mixtures/combinations of the telemetry data. In further aspects, the techniques herein apply the machine learning models associated with the different networks to the same synthetic trace, to detect networks that exhibit abnormal behaviors (i.e., the predictive insights). By presenting this information to a user, the user can easily review the predictive insights and perform what-if analysis by requesting a comparison of the outputs of the models under different network scenarios.

Specifically, according to one or more embodiments of the disclosure as described in detail below, a service receives telemetry data collected from a plurality of different networks. The service combines the telemetry data into a synthetic input trace. The service inputs the synthetic input trace into a plurality of machine learning models to generate a plurality of predicted key performance indicators (KPIs), each of the models having been trained to assess telemetry data from an associated network in the plurality of different networks and predict a KPI for that network. The service compares the plurality of predicted KPIs to identify one of the plurality of different networks as exhibiting an abnormal behavior.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, the techniques herein leverage cross-learning (e.g., comparing data from different organizations and/or networks), which is enabled by the different networks accessing the same cloud infrastructure. In some embodiments, the telemetry data gathered from the various networks can be used to create a significant input trace generated as a mix of network conditions experienced on the different networks. Such trace may then be used as input to different machine learning models that were learned for the different organizations/networks. Note that a machine learning model for a particular network can be seen as a highly non-linear function that maps a set of inputs (e.g., raw network statistics such as client count, signal-to-noise ratios, etc.) into a set of one or more predicted KPIs (e.g., onboarding time, application level throughput, etc.). By running the same input through different data models, it is possible to check whether a particular network would exhibit an abnormal reaction to a particular input. Such information can be leveraged in order to identify predictive insights.

Figure 4:
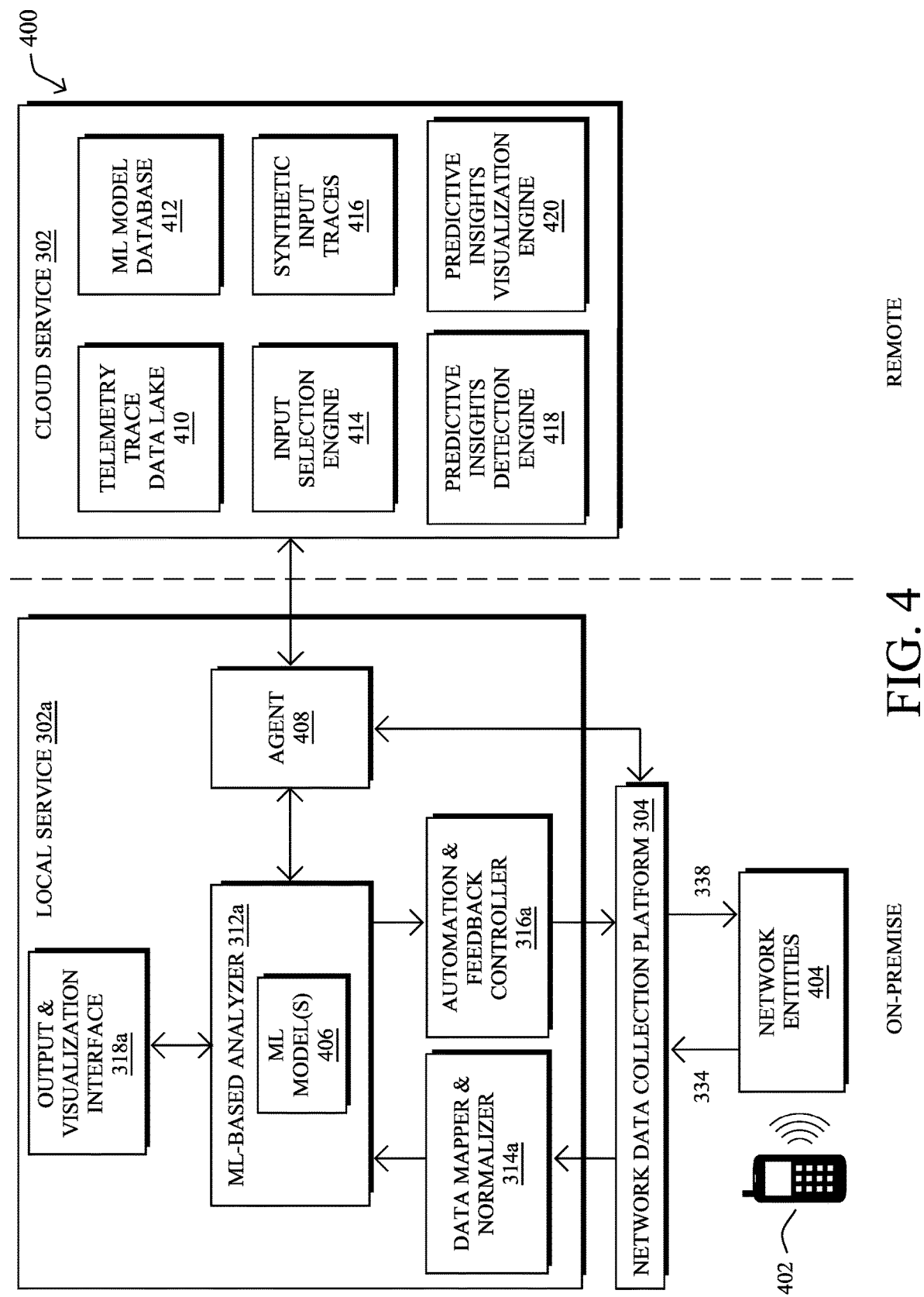
FIG. 4 illustrates an example architecture for an on-premise network assurance service instance.

FIG. 4 illustrates an example architecture 400 for an on-premise network assurance service instance, according to various embodiments. As shown, any or all of the components of network assurance system 300 may be implemented on-premise, as part of the local network to be monitored. For example, assume that the local network comprises any number of network elements/entities 404 that communicate with one or more client devices 402 within the monitored network itself. Network entities 404 may include, but are not limited to, radios, APs, WLCs, routers, switches, servers, or the like. On top of network entities 404 may be network data collection platform 304 that gathers measurements/telemetry data 334 from network entities 404, either directly on network entities 404 or on devices in communication therewith.

In various embodiments, a local service 302a may also be implemented on-premise in the local network, to assess the telemetry data 334 collected locally by network data collection platform 304. In general, local service 302a may include any or all of the components 312a-318a of cloud service 302 to perform the functions described above, locally within the monitored network. For example, local service 302a may be implemented on one or more devices of the local network, allowing service 302a to assess the collected telemetry data 334 locally/on-premise using any number of machine learning-based models 406a, and without having to send these measurements to the external cloud service 302 for assessment. In addition, in some cases, any alerts raised by local service 302a based on the outputs of model(s) 406a may be provided by output and visualization interface 318a to a user interface for review.

As shown in FIG. 4, local service 302a may also include an agent 408 configured to communicate with cloud service 302 that operates as a supervisory network assurance service for local service 302a. In various embodiments, cloud service 302 may include any or all of the components described previously with respect to FIG. 3 (e.g., an analyzer 312, a data mapper and normalizer 314, etc.) and/or any of the components shown. Such components may include a telemetry trace data lake 410, a machine learning (ML) model database 412, an input selection engine 414, synthetic input traces 416, predictive insights detection engine 418, and/or a predictive insights visualization engine 420. These components 410-420 can be combined or omitted, as desired, during implementation. In addition, components 410-420 may be implemented on a singular device that provides service 302 or implemented in a distributed manner, as desired.

During operation, agent 408 of local service 302a may be responsible for any or all of the following tasks:
  Installing and updating the machine learning model(s) 406a executed on-premise and trained in the cloud by service 302. Alternatively, model(s) 406a may be trained locally by service 302a.
  Providing network telemetry data collected by network data collection platform 304 to cloud service 302 for inclusion in telemetry trace data lake 410. In some cases, any telemetry data sent from agent 408 to cloud service 302 may be anonymized, first, so as to preserve the privacy of the local, on-premise network. In further embodiments, this functionality may be omitted.

One of the main capabilities of architecture 400 is the ability of the supervisory service 302 to predict the presence of potential statistical outliers in a group of peer networks by leveraging the predictive capabilities of machine learning models. To this end, supervisory service 302 may oversee the operation of any number of different networks and, if so implemented, their corresponding local instances of service 302.

Figure 5:
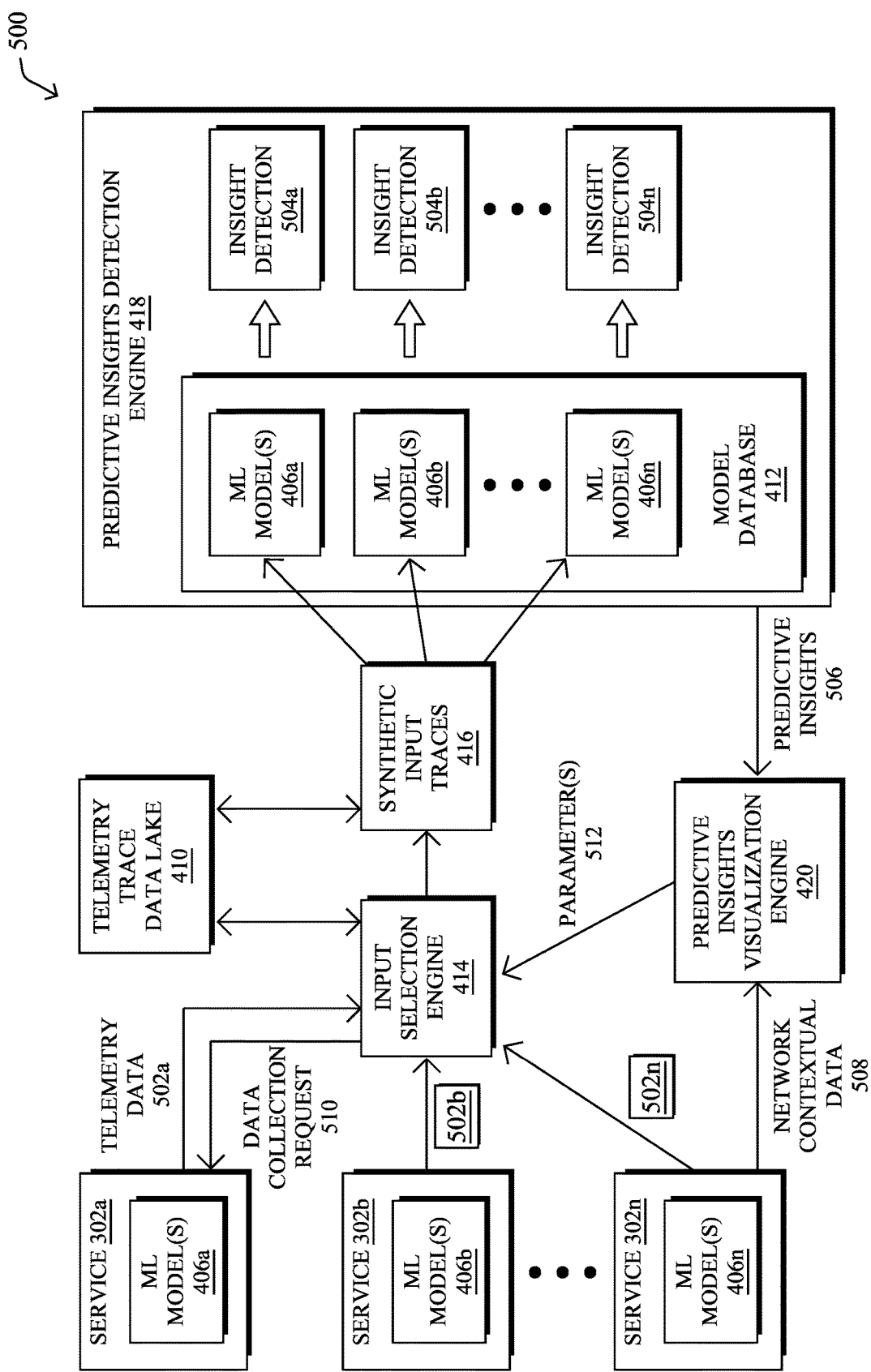
FIG. 5 illustrates an example of the interactions of the components of the architecture of FIG. 4.

FIG. 5 illustrates an example 500 of the interactions and functionalities of the components of architecture 400 in greater detail, according to various embodiments. As shown, assume that components 410-420 are executed by a centralized service, such as cloud-based service 302 shown in FIG. 4, that oversees the operations of any number of local instances of service deployed across any number of different networks. For example, service 302a may be executed on-premise in a first network, service 302b may be executed on-premise in a second network, etc., up to service 302n executed on premise-in an n$^{th}$ network.

As noted previously, each of services 302a-302n may use its own corresponding set of ML model(s) 406 that have been trained using telemetry data captured in that network to predict one or more KPIs for that network. For example, service 302a may use ML model(s) 406a to predict throughput issues, onboarding issues, etc. in the local network of service 302a. In further embodiments, any or all of services 302a-302n may be integrated directly into the cloud-based service 302. In either case, each network will have its own corresponding set of one or more ML model(s) 406 that are used to make predictions about that network.

According to various embodiments, input selection engine 414 may be configured to create telemetry trace data lake 410 as a pool of cross-network telemetry data traces. To do so, in some embodiments, input selection engine 414 may send a data collection request message to request telemetry and other configuration data from a particular network assurance service instance, in order to explore the ML model input space. For example, as shown, input selection engine 414 may send data collection request 510 to the agent (not shown) of service 302a that specifies any or all of the following:

An indication of the requested data source or type—for example, request 510 may request that service 302a send SNMP data, Web Security Appliance (WSA) or other security-related telemetry data, Netflow or IPFIX record data, or the like.

A set of data capture trigger(s)—the data collection request may also specify the condition under which the telemetry data is to be captured by service 302a. For example, request 510 may specify certain days and/or times during which the requested telemetry data is to be captured, may specify under what conditions the telemetry data is to be captured (e.g., when the client count in the network of service 302a exceeds a specified threshold, etc.), combinations thereof, etc.

As would be appreciated, in response to data collection request 510, service 302a may send instructions to any number of networking devices in its network, to start collected the requested telemetry data. In turn, service 302a may provide the collected telemetry data 502a to input selection engine 414 for inclusion in telemetry trace data lake 410.

In addition to requesting the telemetry data from a particular network of interest, input selection engine 414 may also request telemetry data from any number of other networks on the fly. For example, consider the use case where the goal is to predict the wireless global throughput in the network associated with service 302a when the number of clients on the network is above a predefined threshold. In such a case, input selection engine 414 may also request telemetry data 502 from other networks that are similar to the one associated with service 302a in terms AP release, topology, etc., but also have a higher client count.

Thus, input selection engine 414 may request and receive telemetry data 502 from any number of networks (e.g., telemetry data 502b from the network associated with service 302b, telemetry data 502n from the network associated with service 302n, etc.) and store the collected telemetry trace data in data lake 410. In further embodiments, some or all of telemetry data 502 may be provided to input selection engine 414 on a push basis (e.g., without engine 414 first sending a data collection request).

According to various embodiments, another goal of input selection engine 414 is to create synthetic input traces 416 from the telemetry trace data in data lake 410 that cover the largest possible portion of the input feature space of the ML model 406 to be tested. As noted previously, the telemetry data may range from raw packet traces, to WLC telemetry data (e.g., JSON messages, TDL messages, etc.), to Netflow or IPFIX records. In some cases, anonymization techniques can also be applied to the collected telemetry data, in order to prevent the leakage of privacy sensitive information through the cross learning.

Input selection engine 414 may use any of a variety of approaches, to generate synthetic input traces 416 as a mix of telemetry data samples across any number of different networks and/or contexts. In one embodiment, input selection engine 414 may perform a sample random sampling over the telemetry data traces in data lake 410, to generate a synthetic input trace 416. In another embodiment, input selection engine 414 may perform a stratified sampling of the traces in data lake 410, in order to have a uniform sampling per strata, where the strata represents organizations, networks, campuses, or the like. In a further embodiment, input selection engine 414 may perform clustering on the telemetry traces in data lake 410 using a defined similarity metric (e.g., to form clusters of similar traces). In turn, input selection engine 414 may uniformly sample the traces in the cluster(s), to form a synthetic input trace 416. In further embodiments, input selection engine 414 may use a combination of the above approaches, such as by clustering the traces by similarity and then performing simple or stratified sampling per organization, etc.

Another functionality of input selection engine 414 is to characterize the scenario where an input trace in telemetry trace data lake 410 was collected. For example, such characterizations may reflect the size and/or type of network from which the telemetry data was collected, the number of connected clients in that network, the mix of traffic in the network, or the like.

In another embodiment, the collection of the raw telemetry data 502 can be carried out on a network group basis. In other words, the input space coverage may be evaluated by input selection engine 414 independently for different network types. For example, input selection engine 414 can further evaluate the traces based on the network deployments (e.g., corporate vs. campus vs. factory, etc.), the size of the network, an inventory of the network (e.g., the types of devices on the network, the operating systems used by the devices, etc.).

In an additional embodiment, input selection engine 414 may split the resulting mixed, synthetic input trace 416 into separate sub-sections which are representative of different network conditions (e.g. peak traffic times, flash crowds, week-end etc.). Also, in some cases, the collection of telemetry data 502 can be triggered whenever an issue is detected on that network. This allows telemetry trace data lake 410 to also store issue information for association with the synthetic input traces 416.

As a result of the operation of input selection engine 414, the supervisory service will now have one or more synthetic input traces 416 that are mixtures of the raw telemetry data traces observed across the different networks. As would be appreciated, traces 416 are "synthetic" in that they are not actually observed/collected from any particular network, but are generated as a mixture of real, raw telemetry data observed/collected from any number of different networks.

According to various embodiments, predictive insights detection engine 418 may be activated, once one or more synthetic input traces 416 becomes available. In general, predictive insights detection engine 418 is responsible for collecting the current ML models 406 associated with the different networks/sites. For example, predictive insights detection engine 418 may request ML model(s) 406a from service 302a that were trained to assess the telemetry data available in its associated network, ML model(s) 406b from service 302b that were trained to assess the telemetry data available in its associated network, and so on. More specifically, predictive insights detection engine 418 may issue Model Fetching requests to the proper on-premise or cloud components, depending on where the model 406 is being evaluated.

In turn, predictive insights detection engine 418 may store the collected models 406 in model database 412 as part of the supervisory service. In further cases, such as when models 406 are trained by the supervisory service that executes predictive insights detection engine 418 or when models 406 are executed in the cloud by the supervisory service, the supervisory service can simply populate model database 412 with copies of the models 406 without having to request them from the on-premise components.

In various embodiments, predictive insights detection engine 418 uses the different networks' ML models 406 in model database 412 to evaluate the uniform synthetic input traces 416 generated by input selection engine 414. This will allow each model 406 tested by predictive insights detection engine 418 to generate its own predictions, such as one or more predicted KPIs, given the synthetic input trace 416. For example, let K_A(1) represent the value of KPI K as predicted by the model for network A when applied to synthetic trace 1, K_B(1) represent the value of KPI K as predicted by the model for network B when applied to synthetic trace 1. K_C(1) represent the value of KPI K as precited by the model for network C when applied to synthetic trace 1, etc. As a result of testing the synthetic trace across the models for different networks, predictive insights detection engine 418 will have a set of predicted KPIs.

For each of the predicted KPIs output by the models 406 used by predictive insights detection engine 418, predictive insights detection engine 418 may perform a corresponding insight detection 504, to identify any predictive insights from the model outputs/predictions. More specifically, for each of the models 406 in a group, the model output KPIs will be predicted and different indices may be computed by predictive insights detection engine 418 to summarize their distributions. Percentiles, histograms, cumulative distribution functions (CDFs), and the like, are just some examples of the many techniques that predictive insights detection engine 418 can employ to summarize such distributions. Then, predictive insights detection engine 418 may compare the summarized results from the different models, to identify any abnormal behaviors/statistical outliers. These outliers are also referred to herein as predictive insights, as they give visibility on network behaviors that may happen in the future.

By way of example, consider the case in which the network associated with ML model(s) 406a has not experienced a sudden spike in the number of its network clients. However, such a client spike was observed in the networks associated with models 406b and 406n. By using the telemetry data 502b and 502n associated with the client spikes in the synthetic input trace 416, predictive insights detection engine 418 can test how models 406a, 406b, and 406n react in comparison to each other. If the predicted behavior/KPI for the network associated with model 406a is statistically different from those predicted by models 406b and 406n, this could be very useful information to help address any potential spikes in the number of clients on that network.

In various embodiments, predictive insights detection engine 418 may use any number of statistical approaches, to detect predictive insights 506. For example, predictive insights detection engine 418 may leverage computed z-scores, statistical hypothesis testing, or principal component analysis (PCA) reconstruction errors, to detect any outliners in the outputs of models 406. In further cases, predictive insights detection engine 418 could also use more complex techniques such as Density Based Spatial Clustering of Applications with Noise (DBSCAN), Local Outlier Factor (LOF), or Isolation Forests. Such approaches, in general, provide more robust results than standard statistical approaches.

As would be appreciated, predictive insights detection engine 418 can also detect different sets of predictive insights 506 by testing traces 416 associated with different network conditions. For example, a network may behave similarly to others during the weekend, while it could exhibit abnormal behavior during peak usage times.

According to various embodiments, predictive insights detection engine 418 may provide any identified predictive insights 506 to predictive insights visualization engine 420. In general, predictive insights visualization engine 420 is configured to provide indications of the insights 506 to a user interface for review by a user. For example, such visualizations may take the form of histograms, percentiles, or the like. In a further embodiment, predictive insights visualization engine 420 may also provide network contextual data 508 to the user interface regarding the networks and/or abnormal behavior. For example, such contextual data 508 may indicate a spike in client count, also known as a flash crowd scenario, authentication, authorization, and accounting (AAA) server congestion, or the like, that may help explain the abnormal behavior.

More specifically, predictive insights visualization engine 420 may provide the user with a full characterization of the network characteristics of the source networks from which input trace 416 was based. Optionally, in further embodiments, predictive insights visualization engine 420 may also allow the user to perform what-if scenario analysis, to further delve into predictive insights 506. For example, assume that the network associated with model 406a exhibits an abnormal behavior in the case of a flash crowd event with 1,000 clients. When presented with this insight, the user may also want to evaluate how the network would behave in a similar scenario, but with 5,000 clients. In this case, predictive insights visualization engine 420 may allow the user to set one or more parameters 512 that specify the telemetry data to be combined into the synthetic input trace 416 (e.g., number of clients, time of day, mix of application traffic on the network, etc.). Such parameters 512 can be sent by predictive insights visualization engine 420 to input selection engine 414.

In response to receiving parameter(s) 512, input selection engine 414 may first check telemetry trace data lake 410 to see whether any traces are already available that meet the selected scenario of the user. If so, input selection engine 414 may simply use those traces to form a new synthetic input trace 416 and predictive insights detection engine 418 may evaluate that trace using the corresponding models 406. However, if traces that match the parameter(s) 512 are not available in data lake 410, input selection engine 414 may send out any number of data collection request 510 to the different networks, so as to collect the raw telemetry data 502 that meets the requirement of the user and can be used to evaluate this scenario.

Figure 6:
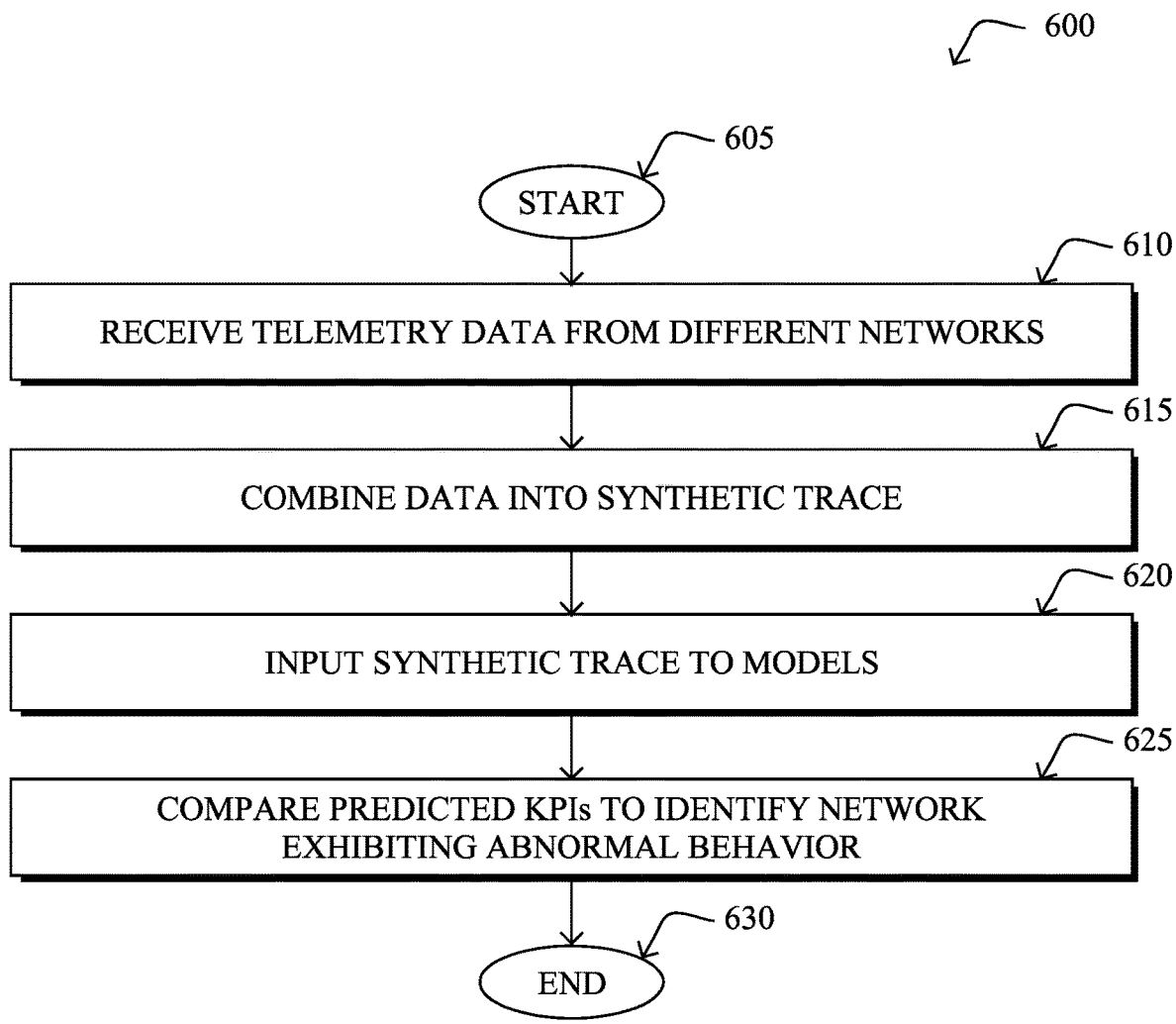
FIG. 6 illustrates an example simplified procedure for using raw telemetry traces to generate predictive insights using machine learning.

FIG. 6 illustrates an example simplified procedure for using raw telemetry traces to generate predictive insights using machine learning, in accordance with one or more embodiments described herein. For example, a non-generic, specifically configured device (e.g., device 200) may perform procedure 600 by executing stored instructions (e.g., process 248) to provide a service to any number of networks. The procedure 600 may start at step 605, and continues to step 610, where, as described in greater detail above, the service may receive telemetry data collected from a plurality of different networks. For example, such telemetry data may comprise SNMP data, security data, Netflow or IPFIX record data, combinations thereof, or the like, from the different networks.

At step 615, as detailed above, the service may combine the telemetry data into a synthetic input trace. In one embodiment, the service may do so by performing clustering on the telemetry data received from the plurality of different networks using a defined similarity metric and then sampling telemetry data from a selected cluster. In another embodiment, the service may randomly sample the telemetry data across the different networks, to form the synthetic input trace. In another embodiment, such sampling may be stratified so as to have a uniform sampling per strata, with each strata being associated with a particular type of organization, network, campus, etc. In further embodiments, the service may first split the telemetry data into sub-sections representative of different network conditions to be tested, such as a particular timeframe (e.g., a day of the week, time, etc.), number of network clients, or the like.

At step 620, the service may input the synthetic input trace into a plurality of machine learning models to generate a plurality of predicted key performance indicators (KPIs), as described in greater detail above. In various embodiments, each of the models may have been trained to assess telemetry data from an associated network in the plurality of different networks and predict a KPI for that network (e.g., model A was trained to predict the KPI for network 1, model B was trained to predict the KPI for network 2, etc.).

At step 625, as detailed above, the service may compare the plurality of predicted KPIs to identify one of the plurality of different networks as exhibiting an abnormal behavior. For example, the service may apply any number of statistical approaches to determine that the behavior of the network in view of the synthetic telemetry data is a behavioral outlier, also referred to as a predictive insight. In turn, the service may provide an indication of the identified network as exhibiting the abnormal behavior to a user interface, thereby allowing the review to assess how the network s expected to behave under different conditions. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of potential statistical deviations, also referred to as predictive insights, in a set of different networks. More specifically, the techniques herein allow raw telemetry traces collected across the set of networks to be used to identify abnormal behaviors of any of the networks. For example, one of the networks may behave very differently than the others in the set when a certain number of clients is present on that network. The techniques herein are able to quickly identify such abnormal behaviors and provide information about the abnormal behaviors for review.

While there have been shown and described illustrative embodiments that provide for using raw telemetry traces to generate predictive insights using machine learning, it is to be understood that various other adaptations and modifications may be made within the spirit and scope of the embodiments herein. For example, while certain embodiments are described herein with respect to using certain models for purposes of forecasting/predicting network KPIs, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a service, telemetry data collected from a plurality of different networks;
    combining, by the service, the telemetry data into a synthetic input trace;
    inputting, by the service, the synthetic input trace into a plurality of machine learning models to generate a plurality of predicted key performance indicators (KPIs), the models comprising at least a first machine learning model trained to assess telemetry data captured in a first network of the plurality of different networks and predict a KPI for the first network and a second machine learning model trained to assess telemetry data captured in a second network of the plurality of different networks and predict the KPI for the second network; and
    comparing, by the service, the plurality of predicted KPIs to identify one of the plurality of different networks as exhibiting an abnormal behavior.

2. The method as in claim 1, further comprising:
    providing, by the service, an indication of the identified network as exhibiting an abnormal behavior to a user interface.

3. The method as in claim 2, further comprising:
    receiving, at the service and via the user interface, one or more parameters that specify the telemetry data to be combined into the synthetic input trace.

4. The method as in claim 1, wherein comparing, by the service, the plurality of predicted KPIs to identify one of the plurality of different networks as exhibiting an abnormal behavior comprises:

determining that the predicted KPI for the identified network is a statistical outlier among the predicted KPIs for the plurality of different networks.

5. The method as in claim 1, further comprising:
retrieving, by the service, the first machine learning model from the first network and the second machine learning model from the second network, wherein the service is a cloud-based service in communication with the first and second networks.

6. The method as in claim 1, wherein combining, by the service, the telemetry data into the synthetic input trace comprises:
performing clustering on the telemetry data received from the plurality of different networks using a defined similarity metric.

7. The method as in claim 1, further comprising:
splitting, by the service, the telemetry data into sub-sections representative of different network conditions.

8. The method as in claim 7, wherein the different network conditions are associated with at least one of: a particular timeframe or a number of network clients.

9. An apparatus, comprising:
one or more network interfaces;
a processor coupled to the network interfaces and configured to execute one or more processes; and
a memory configured to store a process executable by the processor, the process when executed configured to:
receive telemetry data collected from a plurality of different networks;
combine the telemetry data into a synthetic input trace;
input the synthetic input trace into a plurality of machine learning models to generate a plurality of predicted key performance indicators (KPIs), the models comprising at least a first machine learning model trained to assess telemetry data captured in a first network of the plurality of different networks and predict a KPI for the first network and a second machine learning model trained to assess telemetry data captured in a second network of the plurality of different networks and predict the KPI for the second network; and
compare the plurality of predicted KPIs to identify one of the plurality of different networks as exhibiting an abnormal behavior.

10. The apparatus as in claim 9, wherein the process when executed is further configured to:
provide an indication of the identified network as exhibiting an abnormal behavior to a user interface.

11. The apparatus as in claim 10, wherein the process when executed is further configured to:
receive via the user interface, one or more parameters that specify the telemetry data to be combined into the synthetic input trace.

12. The apparatus as in claim 9, wherein the apparatus compares the plurality of predicted KPIs to identify one of the plurality of different networks as exhibiting an abnormal behavior by:
determining that the predicted KPI for the identified network is a statistical outlier among the predicted KPIs for the plurality of different networks.

13. The apparatus as in claim 9, wherein the process when executed is further configured to:
retrieve the plurality of machine learning models from the plurality of different networks.

14. The apparatus as in claim 9, wherein the apparatus combines the telemetry data into the synthetic input trace by:
performing clustering on the telemetry data received from the plurality of different networks using a defined similarity metric.

15. The apparatus as in claim 9, wherein the process when executed is further configured to:
split the telemetry data into sub-sections representative of different network conditions.

16. The apparatus as in claim 15, wherein the different network conditions are associated with at least one of: a particular timeframe or a number of network clients.

17. A tangible, non-transitory, computer-readable medium storing program instructions that cause a service to execute a process comprising:
receiving, at the service, telemetry data collected from a plurality of different networks;
combining, by the service, the telemetry data into a synthetic input trace;
inputting, by the service, the synthetic input trace into a plurality of machine learning models to generate a plurality of predicted key performance indicators (KPIs), the models comprising at least a first machine learning model trained to assess telemetry data captured in a first network of the plurality of different networks and predict a KPI for the first network and a second machine learning model trained to assess telemetry data captured in a second network of the plurality of different networks and predict the KPI for the second network; and
comparing, by the service, the plurality of predicted KPIs to identify one of the plurality of different networks as exhibiting an abnormal behavior.

18. The computer-readable medium as in claim 17, wherein the process further comprises:
providing, by the service, an indication of the identified network as exhibiting an abnormal behavior to a user interface.

* * * * *